US006230735B1

(12) United States Patent
Bravo (10) Patent No.: US 6,230,735 B1
(45) Date of Patent: May 15, 2001

(54) VALVE JACKET (76) Inventor: Sergio M. Bravo, 2872 Tigertail Dr., Los Alamitos, CA (US) 90720

( * ) Notice: Subject to any disclaimer, the term of this patent is extended or adjusted under 35 U.S.C. 154(b) by 0 days.

(21) Appl. No.: 09/273,678

(22) Filed: Mar. 22, 1999

Related U.S. Application Data (60) Provisional application No. 60/110,965, filed on Dec. 4, 1998.

(51) Int. Cl.$^7$ ............................. G01M 3/08; F16K 43/00
(52) U.S. Cl. ........................... 137/312; 73/40.5 R; 73/46; 73/49.1; 73/49.2; 137/315.01; 137/315.18; 138/114; 141/86; 285/13; 285/123.1
(58) Field of Search ..................................... 137/312, 375, 137/315.01, 315.18; 138/113, 114; 141/86, 88; 73/40.5 R, 46, 49.1; 285/13, 123.1; 405/36, 52

(56) References Cited

U.S. PATENT DOCUMENTS

| | | | |
|---|---|---|---|
| 4,062,376 | * 12/1977 | McGrath | 137/312 |
| 4,842,163 | 6/1989 | Bravo | 222/40 |
| 5,156,190 | * 10/1992 | Staley, Jr. | 138/104 |
| 5,228,472 | * 7/1993 | Ougiya et al. | 137/312 |
| 5,297,896 | 3/1994 | Webb | 405/52 |
| 5,341,857 | * 8/1994 | Bravo | 137/312 |
| 5,366,318 | 11/1994 | Brancher | 405/36 |
| 5,511,573 | * 4/1996 | Corte | 73/49.1 |
| 5,529,098 | 6/1996 | Bravo | 141/88 |
| 5,546,977 | * 8/1996 | Chaney | 137/312 |
| 5,590,981 | * 1/1997 | Osborne | 138/114 |
| 5,615,700 | * 4/1997 | Chaney et al. | 137/312 |
| 5,713,387 | * 2/1998 | Armenia et al. | 137/312 |
| 5,782,579 | * 7/1998 | Dupouy et al. | 138/114 |

* cited by examiner

*Primary Examiner*—George L. Walton
(74) *Attorney, Agent, or Firm*—Christie, Parker & Hale, LLP

(57) ABSTRACT

A valve jacket is provided to surround a valve and contain any liquid that may leak from the valve as a part of a secondary containment system of the type found a gasoline service stations. The valve jacket is provided as a hollow body with a pair of openings through which a pair of primary pipelines associated with the valve can extend. One of the two openings is sized large enough that the jacket can be slid over the valve. The two openings are sealed to a pair of secondary conduits associated with the primary pipelines. A reservoir can be provided in the jacket to collect any liquid and a sensor can be provided in the reservoir to detect the presence of liquid in the reservoir. Preferably, a removable and sealable cap is provided to allow access to the valve for operation.

19 Claims, 7 Drawing Sheets

VALVE JACKET

CROSS-REFERENCE TO RELATED APPLICATION(S)

This application claims priority pursuant to 35 U.S.C. §119(e) and 37 CFR §1.78(a)(4), to provisional Application No. 60/110,965, filed Dec. 4, 1998.

FIELD OF THE INVENTION

The present invention relates to secondary containment systems for containing fuel spills at gasoline service stations. More specifically, it is directed to a jacket used for providing secondary containment around a ball valve of the type frequently provided near the fuel pump outlet of the product pump.

BACKGROUND OF THE INVENTION

Secondary containment systems at gasoline service stations are commonly used in order to contain any leakage from the underground piping associated with such service stations. A typical service station includes a number of underground product tanks which contain the different grades of fuel sold and a number of different product dispensers for dispensing the products to customers. Product pumps, typically one associated with each product tank, are located at the respective product tanks and feed the various products to the dispensers through underground product conduits.

As the first component of a typical secondary containment system, product tanks are provided of a double-walled construction so that any leakage from the tank will be contained and will not contaminate the surrounding soil. Such secondary containment systems also include double walled product conduits, similarly intended to contain any product leakage from the product conduits and prevent contamination.

A typical secondary containment system further includes a number of underground containment boxes which house the piping connections between the product tanks and the product conduits as well as between the product conduits and product dispensers. A first group of containment boxes are located at each product tank. The product pumps are generally located within these containment boxes. These containment boxes provide access to the product pumps for maintenance purposes and are also intended to contain any product that may spill from the product pumps or their associated piping.

A second group of containment boxes are located under each product dispenser or group of product dispensers. These containment boxes house the necessary piping connections and fittings that connect the product lines to the dispensers and contain any product that may spill from the dispenser or its associated piping.

At the low points of such secondary containment piping systems, liquid sensors are often used so as to monitor whether any leakage has occurred from the system. Such sensors can be used to either sound an alarm or shut down equipment as necessary to prevent further spillage. Some examples of the various components used in secondary containment systems can be found in U.S. Pat. No. 4,842,163 which is hereby incorporated by reference.

SUMMARY OF THE INVENTION

The present invention is directed to an improved valve jacket for use with secondary containment systems of the type associated with the underground piping found at gasoline service stations. The valve jacket is used as a component in the secondary piping and is designed to enclose a valve and contain any leakage from the valve. The valve jacket includes a hollow body which surrounds the valve. On opposite ends of the body are two fittings for sealing the valve jacket to the secondary conduits which surround the inlet and outlet primary conduits fastened on either end of the valve. The outlet fitting is an outlet lip to which the secondary conduit is fastened such as with a hose clamp. The inlet fitting has a larger opening and uses a flexible boot to seal the valve jacket to the secondary conduit. The opening to the inlet fitting is large enough that the valve jacket can be slid over the valve.

The valve jacket also includes a sensor housing which includes a lower reservoir. The sensor housing and body are in open communication with one another such that any leakage of liquid into the valve jacket collects in the reservoir. A liquid sensor can be placed in the sensor housing to detect the collection of any liquid within the reservoir.

The valve jacket further includes a valve access bonnet extending up from the body. A similarly provided sensor bonnet extends up from the sensor housing. Cap portions of each of the valve access bonnet and sensor bonnet are integrally molded into the valve jacket but can be removed from the respective bonnets prior to installation. Once removed, the caps can be removably sealed to the respective bonnets using appropriate boot fittings. The valve access cap is useful in that it allows access to the valve without requiring the disassembly of the entire secondary containment system. Access is periodically necessary to shut off the valve or to perform routine maintenance procedures on the valve. The sensor cap is similarly useful in that it allows access to the sensor for periodic maintenance or testing of the sensor without significant disassembly.

DESCRIPTION OF THE DRAWINGS

Other features aspects and advantages of the present invention will be more fully understood when considered with respect to the following detailed description, appended claims and accompanying drawings where:

DETAILED DESCRIPTION OF THE INVENTION

Figure 1:
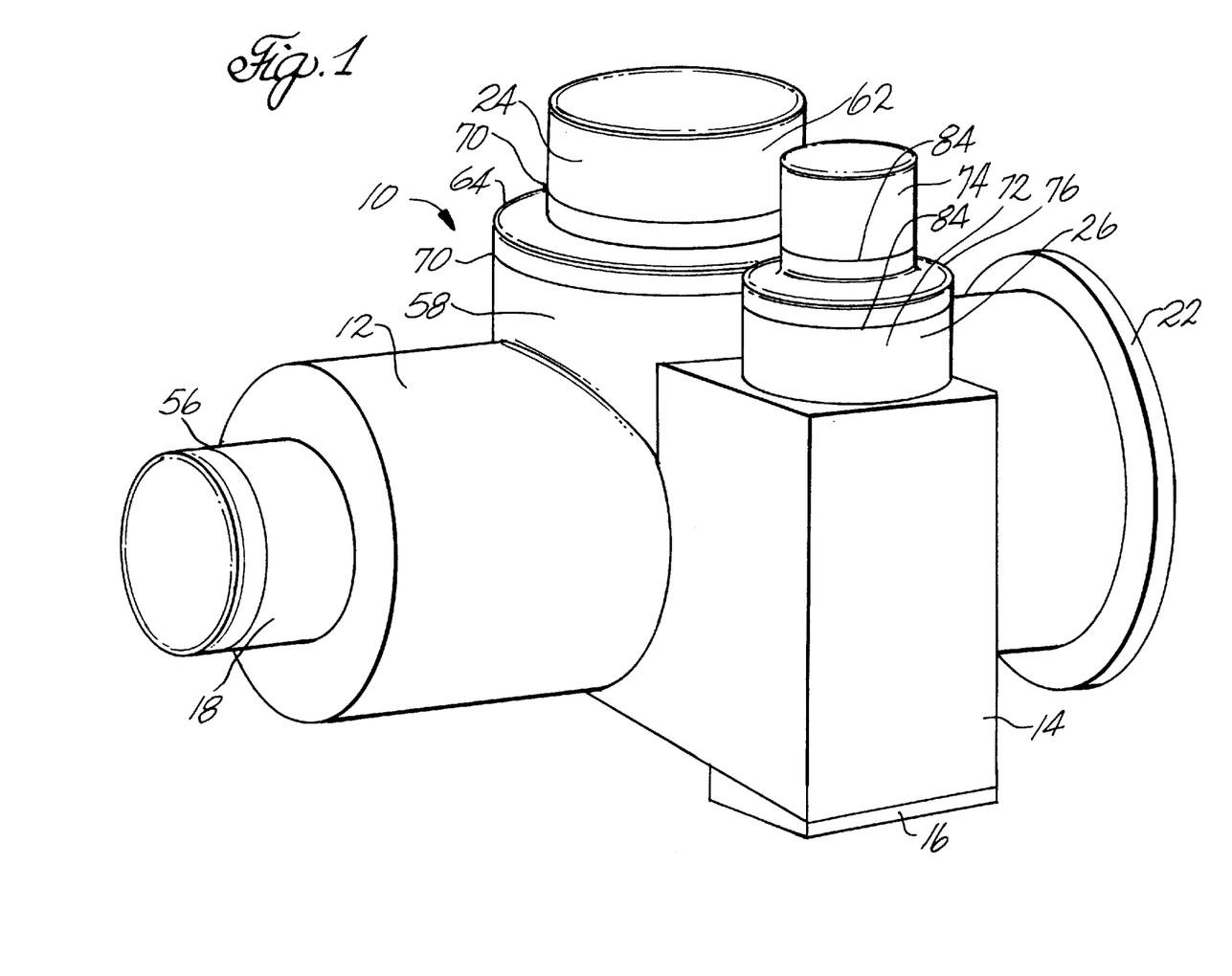
FIG. 1 is a perspective view of a valve jacket of the present invention.

The primary components of the valve jacket of the present invention are best illustrated in FIGS. 1–4. The valve jacket 10 is generally provided as a shell that slips over a ball valve such as is commonly used with service station product conduits. The valve jacket includes a cylindrical body 12 and an adjoining sensor housing 14. The cylindrical body and sensor housing are in open communication with one another. The sensor housing includes a lower reservoir 16 which serves as a low point for containing any hydrocarbons that spill into the valve jacket. At a first end of the cylindrical body portion an outlet lip 18 is provided. Opposite the outlet lip on a second side of the cylindrical body portion is an inlet flange 22. Extending up from the cylindrical body is a valve access bonnet 24. Extending up from the sensor portion is a sensor access bonnet 26. The valve jacket body is preferably molded of cross linked polyethylene that is both corrosion resistant and resistant to chemicals and hydrocarbons of the type found in petroleum products. FIG. 1 best illustrates the valve jacket as molded.

Figure 2:
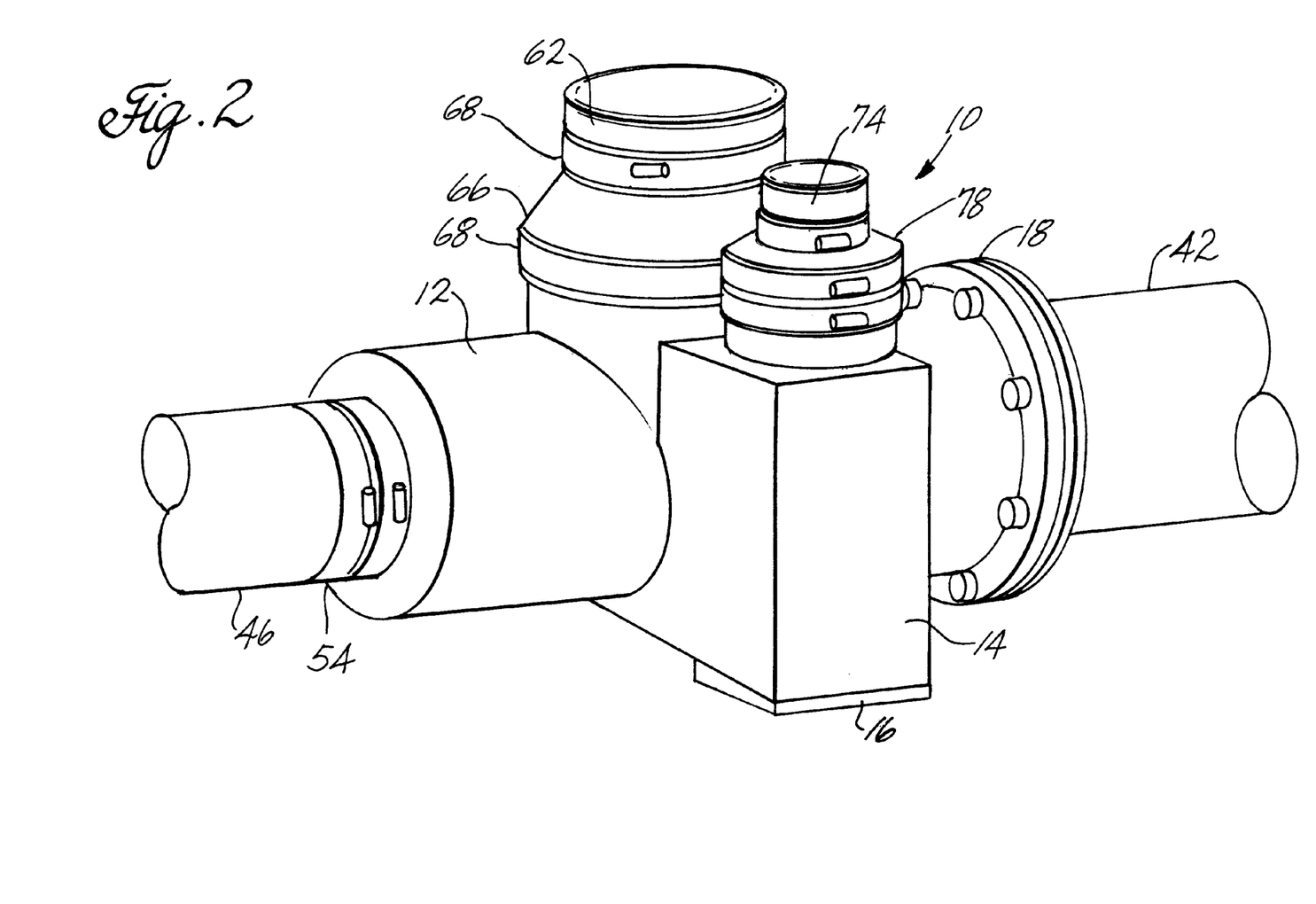
FIG. 2 is a perspective view of a valve jacket of the present invention as installed on an underground piping system.
Figure 3:
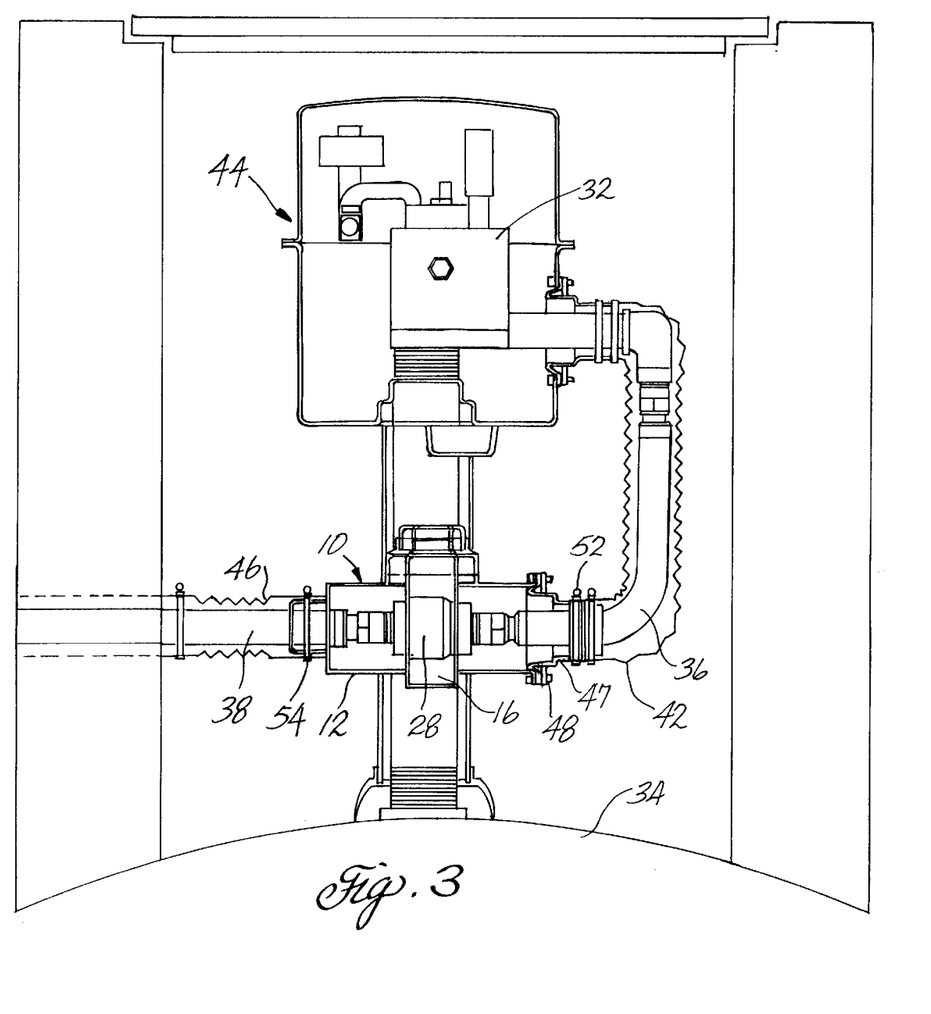
FIG. 3 is a front elevation view in section illustrating the valve jacket of the present invention as installed.
Figure 4:
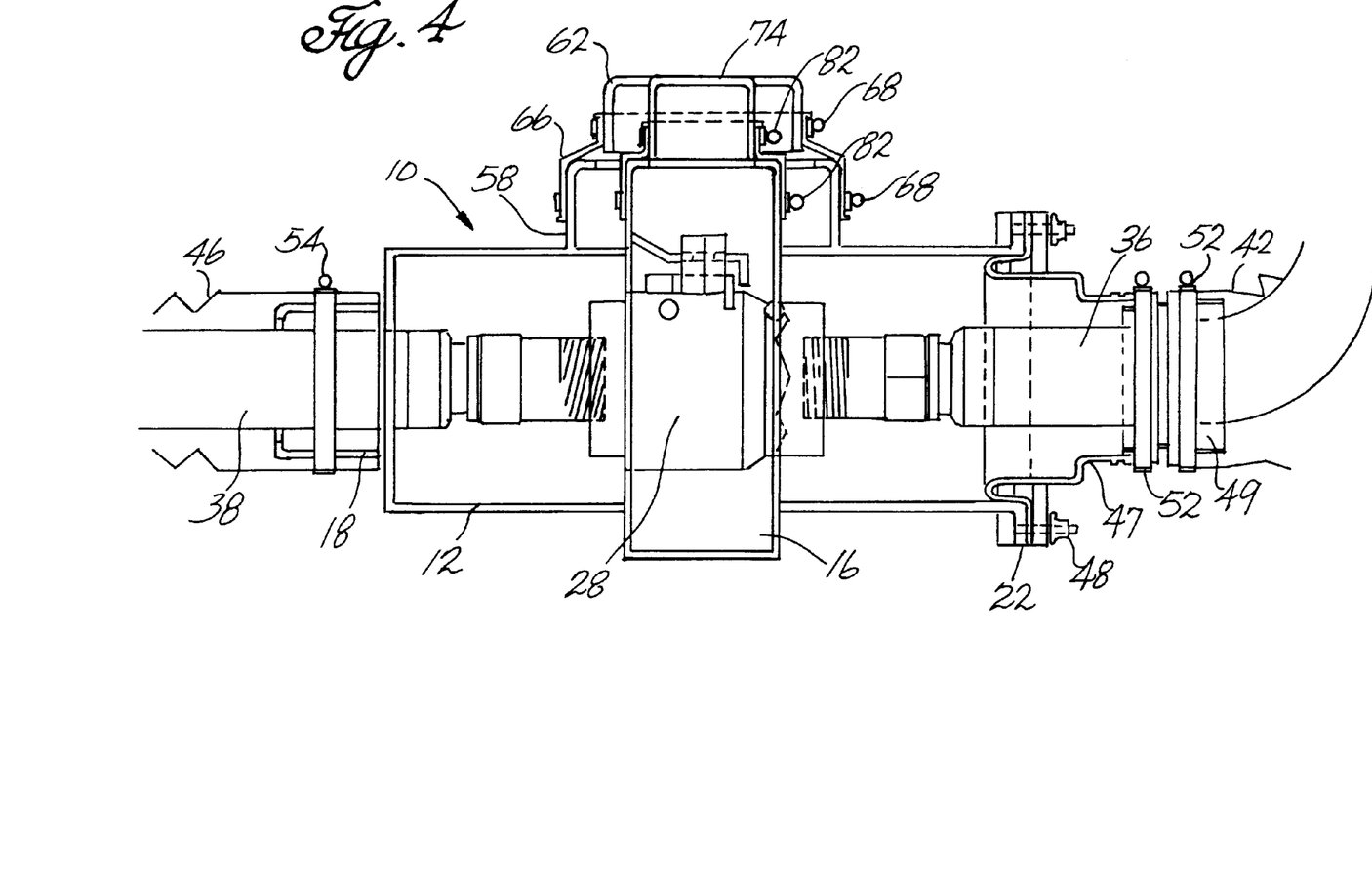
FIG. 4 is an enlarged elevation view in section of the valve jacket of FIG. 3 as installed.

Referring to FIGS. 2–4, a valve jacket of the present invention is illustrated as installed with a secondary containment system. The valve jacket is designed to enclose a valve such as a ball valve 28 of the type typically found downstream of a product pump 32 located above a product tank 34. A product pump and ball valve are connected to one another by a first length of primary product conduit 36. A second length of primary product conduit 38 is provided from the ball valve to one or more product dispensers located at the service station. The primary product conduits are preferably of a flexible material.

In order to contain any spill of product, secondary containment conduits are provided to surround the primary product conduits. A first length of secondary conduit 42 is provided between a pump containment box 44 and the valve jacket of the present invention. The pump containment box is preferably of the design known as the B112 UniSump™ manufactured by Bravo Systems, Inc. and described in co-pending U.S. patent application Ser. No. 09/160,506 which is hereby incorporated by reference. From the valve jacket, a second length of secondary conduit 46 is provided to surround the primary product conduit which extends to the product dispensers. The secondary conduits are preferably made of a flexible material. It is also preferred that the second secondary conduit be of a flexible bellows construction so as to simplify installation of the valve jacket of the present invention as will become apparent below.

The secondary conduits are attached to the valve jacket through the use of one or more flexible boot fittings. The first secondary conduit is fastened to the flange of the valve jacket with an inlet boot 47 such as the type sold by S. Bravo Systems, Inc. and known as the B34 UniFitting™. Such a fitting is described in U.S. Pat. No. 5,826,919 which is hereby incorporated by reference. The inlet boot attaches to the valve jacket at its inlet flange by a plurality of studs and nuts 48. A short nipple 49 is used to attach the boot to the length of secondary containment conduit with a pair of conventional hose clamps 52.

In the preferred embodiment, the second length of secondary containment conduit is fastened directly to the outlet lip of the valve jacket by one or more hose clamps 54. In order to ensure that the length of secondary containment conduit remains firmly attached to the valve jacket, a circumferential bead 56 is preferably provided at the outlet lip. If a more rigid secondary containment conduit is used, it can be sealed to the outlet lip using a sleeve-shaped flexible boot with one or more hose clamps attaching the boot to the outlet lip and one or more hose clamps attaching the boot to the rigid secondary containment conduit.

The valve access bonnet, as pointed out above, is preferably molded with the valve jacket as a single unit. The valve access bonnet is provided as a sleeve 58 extending up from the top of the cylindrical body which necks down to a valve bonnet cap 62. Preferably, the sleeve is about 6 inches in diameter, necking down to a cap about 4½ inches in diameter. The cap is preferably removed from the rest of the valve jacket by cutting it from the sleeve at the neck portion 64. While such cutting can be done in the field during installation, it is preferably done as a manufacturing step prior to installation. The cap portion of the valve access bonnet is useful for providing access to the valve after installation without the need for disassembling the entire piping structure.

The valve access cap is sealed to the valve jacket through the use of a flexible reducer boot 66 of a type generally known in the industry. Such a reducer boot is fastened to the sleeve of the valve access bonnet and to the cap with a pair of hose clamps 68. It should be noted that it is desirable to leave at least a portion of the neck on both the sleeve and the bonnet cap valve when the cap is cut from the rest of the valve jacket as the neck provides additional rigidity to the structure at the seals between the sleeve and reducer boot and the cap and reducer boot. Two beads 70 are provided on the sleeve and valve bonnet cap to prevent the reducer boot from slipping off of either the sleeve or the cap.

Similar to the valve access bonnet, a sensor bonnet is provided extending upwardly from the sensor housing of the valve jacket. The sensor bonnet is preferably provided as a sleeve 72 which necks down to a sensor cap 74. The sleeve is preferably about 3½ inches in diameter while the cap is about 2½ inches in diameter. As with the valve access bonnet, the sensor bonnet is molded as one piece combined with the valve jacket during manufacturing and is then trimmed at a bonnet neck portion 76 to separate the sensor cap from the rest of the valve jacket. The sensor cap can then be reattached to the sleeve with a reducer boot 78 and hose clamps 82 of the type well known in the industry. As with the sleeve and cap of the valve access bonnet, the sensor bonnet is preferably molded with beads 84 on the sensor sleeve and sensor cap to later help to hold the reducer boot in place. Furthermore, when the sensor cap is cut from the rest of the valve jacket, it is preferred to leave a portion of the neck on both the sensor sleeve and the sensor cap to provide added rigidity to the structure.

As assembled, the valve jacket is useful for containing any spill of the product which flows through the primary product conduit. In a preferred installation, such as that illustrated in FIG. 3, the reservoir of the valve jacket forms a low point in the system such that any fuel that spills from the primary product conduit between the pump outlet and the product dispenser flows into the valve jacket and collects in the reservoir.

Figure 5:
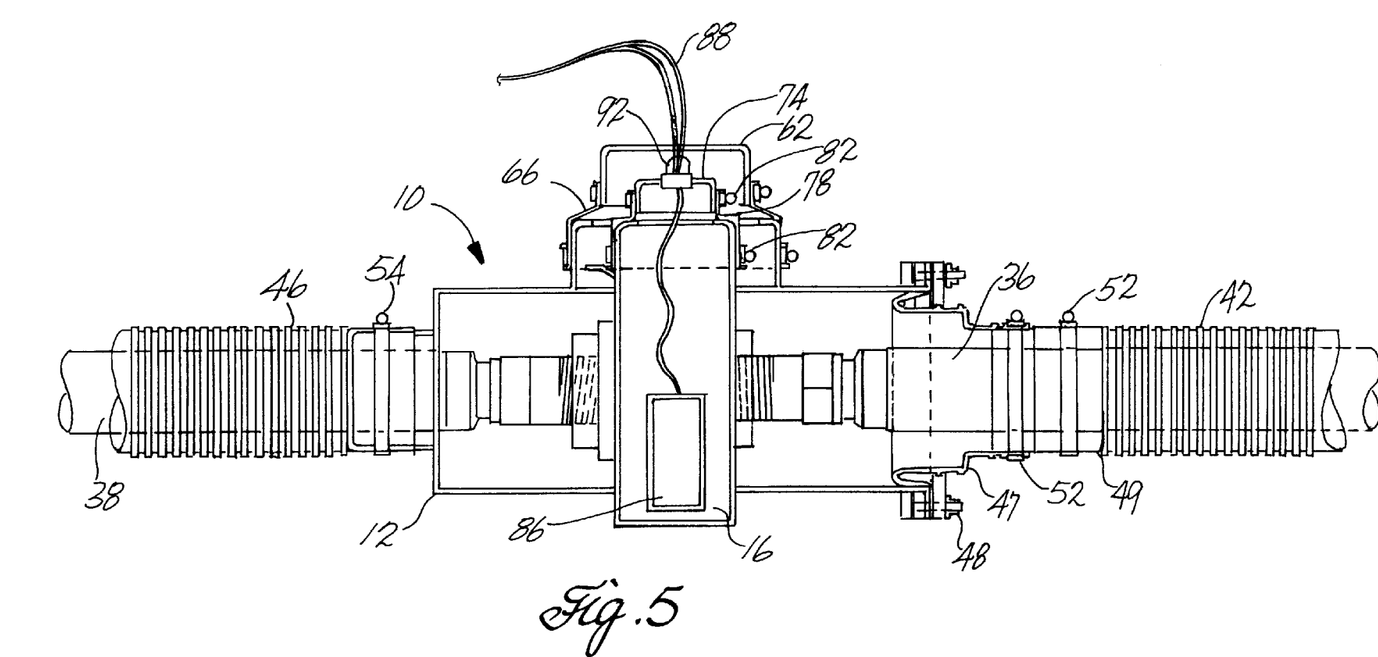
FIGS. 5–7 are elevation views in section of valve jackets illustrating different liquid sensor configurations.

As is best illustrated in FIG. 5, an electronic liquid sensor 86 is preferably placed within the sensor housing of the valve jacket to detect the presence of any liquid that collects in the reservoir. The reservoir should preferably have a fairly small volume, thereby causing an amplification effect such that only a small amount of liquid needs to collect for the sensor to recognize the presence of the liquid. The wiring 88 for the electric sensor extends through a hole bored in the reservoir cap and is sealed with a conventional compression fitting 92 as is known in the industry. The wiring can then extend to the surface in order to remotely monitor whether any liquid has collected within the valve jacket. Of course, if any maintenance is required of the sensor, the sensor can easily be accessed by removing the sensor cap.

Figure 6:
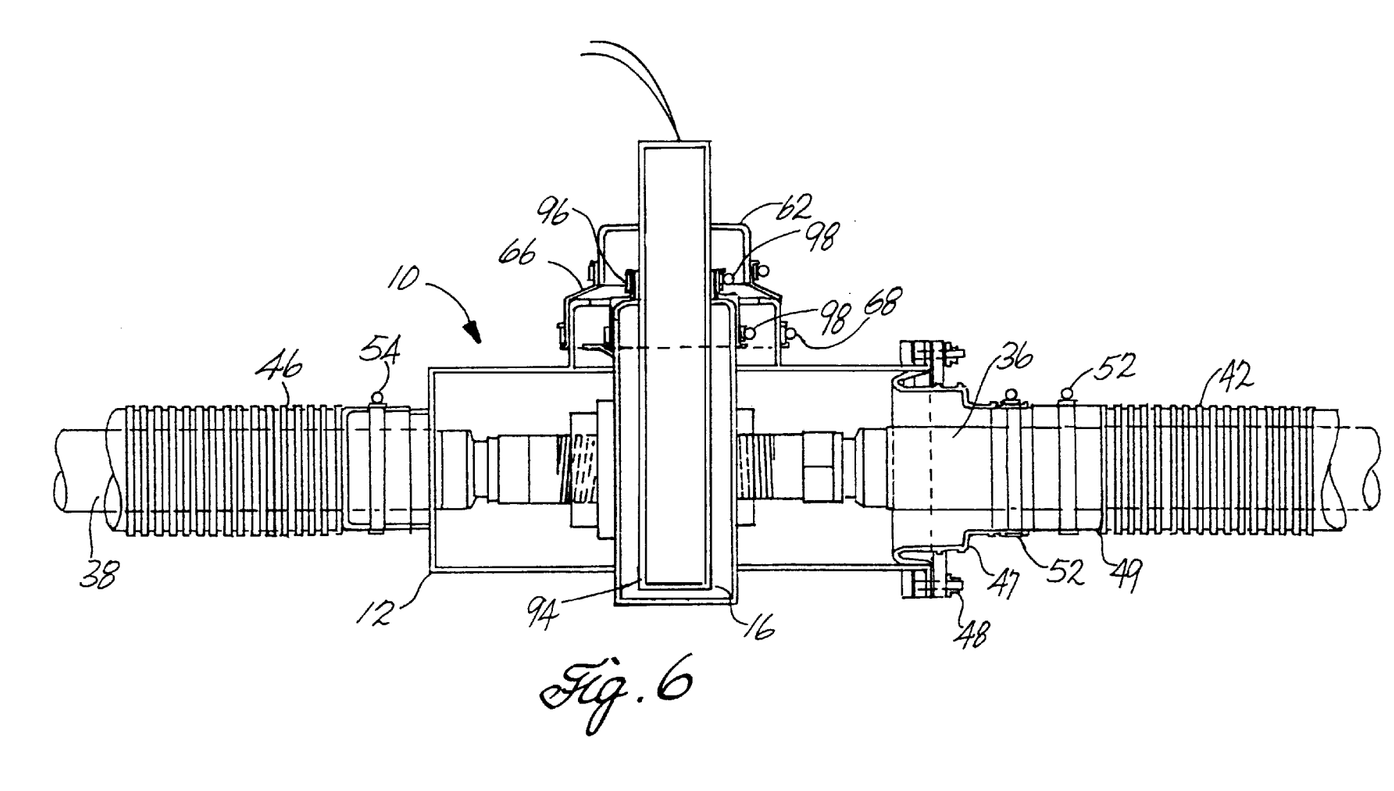

As an alternative embodiment, as best illustrated in FIG. 6, the valve jacket is used with a large electronic sensor 94 which would not easily fit within the sensor housing of the valve jacket previously described. According to this embodiment, the sensor cap is discarded and a reducer boot 96 is used to seal between the sleeve of the sensor bonnet and the outer surface of the electronic sensor using a pair of hose clamps 98. Such an embodiment is useful where it is desired to reuse an existing sensor that might not easily fit within the sensor housing.

Figure 7:
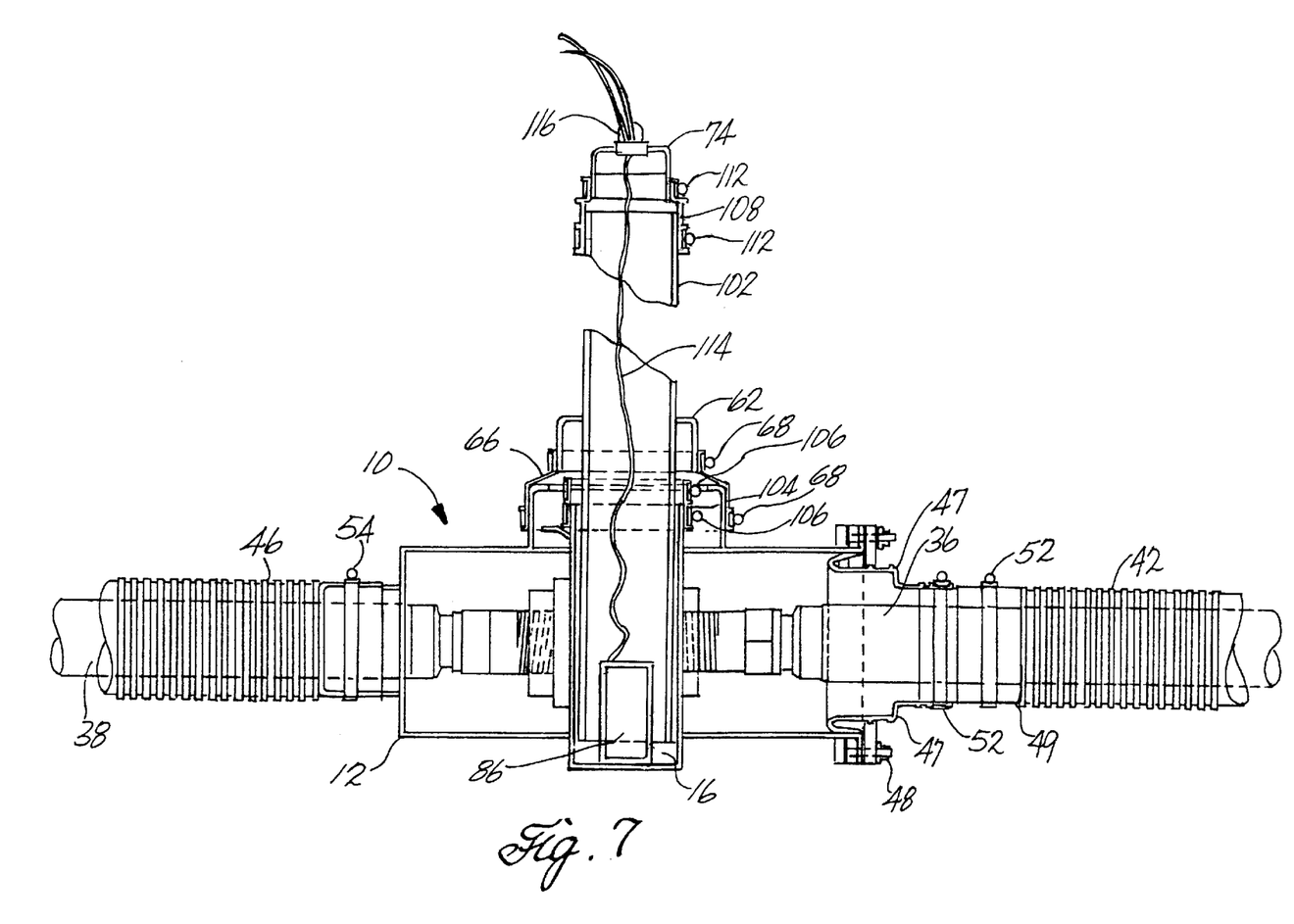

Yet another embodiment for the sensor configuration is illustrated at FIG. 7. Here an extension pipe 102 is provided extending up from the sensor bonnet to a point near ground level. Preferably a 2 inch nominal diameter extension pipe is used. The extension pipe is sealed to the sensor sleeve of the valve jacket with a flexible boot 104 and a pair of hose clamps 106. A reducer boot 108 is provided at the top of the extension pipe and seals the sensor cap to the extension pipe with hose clamps 112. The sensor wiring 114 extends through a hole bored in the sensor cap and is sealed with a conventional compression fitting 116.

The use of any one of the embodiments described is useful in that the invention allows convenient access into the valve jacket after installation. In order to gain access, one or more hose clamps are loosened so that the respective cap can be removed. For the valve, this permits manual operation of the valve, visual inspection of the valve or maintenance to the valve. For the sensor, removal of the sensor cap permits visual inspection of either the sensor or the reservoir, or maintenance, testing or replacement of the sensor without the need for disassembling the entire secondary containment system. The use of an extension pipe as illustrated in FIG. 7 provides further benefits as it further simplifies access into the valve jacket for inspection of the electronic sensor from a point near ground level without the need to climb into the lower portions of the manhole.

A further benefit of the valve jacket of the present invention is its versatility in that the same valve jacket can be used for numerous different applications. As illustrated in FIG. 4 the jacket can be used as a low point of the containment system in order to monitor the collection of liquid within the secondary containment system. This is especially useful for those installations where the pump containment box is not the low point in the system. However, even in those applications where the pump containment box does form a low point in the system and there is no need to utilize the reservoir of the valve jacket, the valve jacket of the present invention can be useful for secondary containment around a ball valve. For such an application, the reservoir need not be used and the sensor cap can be left in place permanently by not cutting it from the sensor sleeve. Later, if a sensor is deemed to be desirable in the valve jacket, the cap can be cut from the valve jacket, a sensor can be inserted, and the valve jacket can be reassembled with the appropriate reducer boot, compression fitting and hose clamps as described above.

As yet another variation, the valve jacket of the present invention can be used as a low point collection reservoir even if no valve is provided on the product line. More specifically, the valve jacket can be placed between two lengths of secondary conduit at a low point in the secondary containment system and the valve bonnet can be permanently sealed. A sensor can then be placed in the reservoir as set forth above. Preferably for such an installation, the valve access cap is not removed from the valve access bonnet, but is left as originally molded.

In order to install the valve jacket of the present invention, first the second length of secondary conduit is placed over the primary conduit extending to the product dispensers. The valve jacket is then placed over the primary conduit and the valve is connected to the primary conduit using a conventional fitting. The first length of primary conduit is then threaded to the inlet side of the valve. The large opening on the inlet flange side of the valve jacket permits the valve to be easily inserted into the valve jacket for these assembly steps. If the standard valve handle provided on the valve prevents the valve from fitting completely inside the valve jacket, the handle may need to be removed or trimmed. In any installation, a simple extension tool can be used to operate the valve after a valve jacket has been installed by removing the appropriate cap, inserting the tool into the valve jacket and engaging it with the valve mechanism. The details of the design of such an extension tool would be apparent to one of ordinary skill in the art.

Referring back to the installation procedure, in order to tighten the primary conduits to either side of the valve, the valve jacket is slid in the direction of the primary conduit running to the product dispensers by compressing the secondary conduit. The use of a secondary conduit of a bellows configuration simplifies this compression step. A wrench then can be used on the fitting fastening the primary conduit from the product pump to the valve by turning the fitting, valve and valve jacket together. The remaining secondary conduit, the valve access cap and the sensor cap can be installed using the various hose clamps and other apparatus and procedures as described above.

While the valve jacket of the present invention is described as being made of a durable plastic material which is preferred for its lightness of weight, its simplicity of manufacturing and the ease with which the valve access cap and sensor cap can be removed from a valve jacket molded as a single piece, it should be clear to one of ordinary skill in the art that the valve jacket could also be made of metal or other appropriate materials. Moreover, while it is preferred to mold the valve jacket with the valve access and sensor caps in place, such components may be molded as separate components.

The present invention provides a system that is simple to install and versatile in the various configurations with which it can be used. Furthermore, and perhaps most importantly, it will reliably contain any product leakage that may occur.

What is claimed is:

1. A valve jacket comprising:
    a hollow body adapted to encase a valve, the valve for attachment to first and second primary conduits, the first and second primary conduits being associated with first and second secondary conduits, respectively, the hollow body defining:
        a first opening through which the first primary conduit can extend;
        a second opening through which the second primary conduit can extend, the second opening being of a size large enough to permit the valve to be inserted into the hollow body; and
        a third opening; and
    a clamp adapted to seal the first secondary conduit to the first opening;
    a boot adapted to seal the second secondary conduit to the second opening; and
    a reservoir in fluid communication with the hollow body for collecting any fluid that collects within the hollow body wherein the third opening of the hollow body permits access to the reservoir.

2. The valve jacket of claim 1 further comprising a cap for sealing the third opening.

3. The valve jacket of claim 2 further comprising a sensor for sensing the presence of fluid within the reservoir.

4. The valve jacket of claim 1 wherein the boot is a first boot and the sensor is an electrical sensor including an electrical conduit, the valve jacket further comprising a cap adapted to cover the third opening, a second boot adapted to provide a seal between the cap and the third opening and a seal between the electrical conduit and the cap.

5. The valve jacket of claim 4 wherein the cap is a first cap and the hollow body further comprises a fourth opening for permitting access to the valve, the valve jacket further comprising a second cap for sealing the fourth opening.

6. The valve jacket of claim 5 wherein the first and second caps are provided integral to the hollow body, the first and second caps being capable of removal from the valve jacket by cutting, thereby forming the third and fourth openings, the first cap being resealable to the hollow body with the second boot and the second cap being resealable to the hollow body with a third boot.

7. The valve jacket of claim 4 wherein the second opening of the hollow body further comprises a flange to which the first boot can be removably attached.

8. A valve jacket comprising:
   a hollow body adapted to encase a valve, the valve for attachment to first and second primary conduits, the first and second primary conduits being associated with first and second secondary conduits, respectively, the hollow body including a first opening through which the first primary conduit can extend, and a second opening through which the second primary conduit can extend, the second opening being of a size large enough to permit the valve to be inserted into the hollow body;
   a clamp adapted to seal the first secondary conduit to the first opening;
   a first boot adapted to seal the second secondary conduit to the second opening;
   a cap integral to the hollow body and capable of removal from the hollow body by cutting to form a third opening in the hollow body; and
   a second boot adapted to attach the cap to the hollow body to thereby seal the third opening.

9. The valve jacket of claim 8 further comprising a reservoir in fluid communication with the hollow body for collecting any fluid that collects within the hollow body.

10. The valve jacket of claim 9 wherein the hollow body further comprises a fourth opening adapted for permitting access to the reservoir.

11. The valve jacket of claim 10 further comprising a sensor for sensing the presence of fluid within the reservoir.

12. The valve jacket of claim 11 wherein the cap is a first cap and the sensor is an electrical sensor, the valve jacket further comprising a second cap adapted to cover the fourth opening and a third boot adapted to provide a seal between the second cap and the fourth opening.

13. The valve jacket of claim 8 wherein the second opening of the hollow body further comprises a flange to which the first boot can be removably attached.

14. A valve jacket comprising:
   a hollow body adapted to encase a valve, the valve for attachment to first and second primary conduits, the first and second primary conduits being associated with first and second secondary conduits, respectively, the hollow body including a first opening through which the first primary conduit can extend, a second opening through which the second primary conduit can extend, the second opening being of a size large enough to permit the valve to be inserted into the hollow body and a third opening adapted to permit access to the valve;
   a clamp adapted to seal the first secondary conduit to the first opening;
   a first boot adapted to seal the second secondary conduit to the second opening;
   a cap adapted to seal the third opening wherein the cap is provided integral to the hollow body and is capable of removal from the hollow body by cutting;
   a second boot for sealing the cap to the hollow body; and
   a reservoir in fluid communication with the hollow body for containing any fluid that collects within the hollow body.

15. The valve jacket of claim 14 wherein the hollow body further comprises a fourth opening adapted to permit access to the reservoir.

16. The valve jacket of claim 15 further comprising a sensor for sensing the presence of fluid within the reservoir.

17. The valve jacket of claim 16 wherein the sensor is an electrical sensor including an electrical conduit, the valve jacket further comprising a seal between the electrical conduit and the fourth opening.

18. The valve jacket of claim 17 wherein the cap is a first cap and the seal between the electrical sensor and the fourth opening comprises a third boot and a second cap.

19. A valve jacket comprising:
   a hollow body adapted to encase a valve, the valve for attachment to first and second primary conduits, the first and second primary conduits being associated with first and second secondary conduits, respectively, the hollow body comprising:
     a reservoir for collecting any fluid that collects within the hollow body;
     a first opening through which the first primary conduit can extend;
     a second opening through which the second primary conduit can extend, the second opening being of a size large enough to permit the valve to be inserted into the hollow body; and
     a third opening permitting access to the reservoir; and
   a clamp adapted to seal the first secondary conduit to the first opening;
   a first boot adapted to seal the second secondary conduit to the second opening;
   an electrical sensor including an electrical conduit, the electrical sensor for sensing the presence of fluid within the reservoir;
   a cap adapted to cover the third opening;
   a second boot adapted to seal the cap to the third opening; and
   a seal between the cap and the electrical conduit.

* * * * *